United States Patent [19]
Bachl

[11] Patent Number: 5,737,167
[45] Date of Patent: Apr. 7, 1998

[54] RESIDUAL CURRENT SAFETY SWITCH

[75] Inventor: Hubert Bachl, Vienna, Austria

[73] Assignee: EH SCHRACK Energietechnik GmbH, Vienna, Austria

[21] Appl. No.: 682,581

[22] PCT Filed: Jan. 24, 1995

[86] PCT No.: PCT/AT95/00012

§ 371 Date: Sep. 5, 1996

§ 102(e) Date: Sep. 5, 1996

[87] PCT Pub. No.: WO95/20257

PCT Pub. Date: Jul. 27, 1995

[30]    Foreign Application Priority Data

Jan. 24, 1994 [AT] Austria ........................... 126/94

[51] Int. Cl.[6] ........................................ H02H 3/18
[52] U.S. Cl. ........................... 361/79; 361/99; 361/93
[58] Field of Search .......................... 361/79, 87, 93, 361/99, 88, 91, 56, 86

[56]    References Cited

U.S. PATENT DOCUMENTS 4,015,169  3/1977  Misencik ........................... 361/45
4,618,907  10/1986  Leopold ........................... 361/45
5,195,008  3/1993  Harr ................................. 361/42

FOREIGN PATENT DOCUMENTS

| 0 633 640 | 1/1995  | European Pat. Off. . |
| 35 28 702 | 2/1986  | Germany . |
| 2 244 398 | 11/1991 | United Kingdom . |

*Primary Examiner*—Fritz Fleming
*Assistant Examiner*—Michael J. Sherry
*Attorney, Agent, or Firm*—Henry M. Feiereisen

[57]    ABSTRACT

A residual current safety switch has a residual current transformer (3) connected to an evaluation circuit (5) that controls an electromagnetic trigger device (K1) for actuating switching contacts (1, 2). An overvoltage protection circuit (V1), for example designed as a voltage-dependent resistor, is provided. The evaluation circuit (5) and/or the overvoltage protection circuit (V1) are/is connected to terminals that supply them with voltage when the switching contacts (1, 2) are closed through lines (7, 8), with one of the lines extending through the residual current transformer (3) and the other not. The supply current of the electronic components and/or the current that flows through the overvoltage protection circuit (V1) is lower than the triggering current when the nominal voltage is applied.

2 Claims, 3 Drawing Sheets

RESIDUAL CURRENT SAFETY SWITCH

BACKGROUND OF THE INVENTION

The invention refers to a residual current safety switch of a type including a residual current transformer and an evaluation circuit connected therewith and controlling an electromagnetic trigger device for actuation of switching contacts, and further including an overvoltage protection circuit, e.g. in form of a voltage-dependent resistor.

Conventional residual current safety switches of this type (hereinafter called short "DI-switch") effect the voltage supply of the electronic components via an auxiliary contact connected to a power line either before the residual current transformer or after the residual current transformer. This solution has the drawback that the electronic components as well as the pertaining overvoltage protection remain unprotected, and excessive power supply may lead to a defect of this protection, or in case of outage of voltage supply to the electronic components, without any capability to recognize such a defect from outside.

SUMMARY OF THE INVENTION

It is the object of the invention to eliminate these drawbacks and to provide a DI-switch of the afore-described type, which protects the installed overvoltage protection as well as the voltage supply circuit of the electronic components.

In accordance with the invention, this is attained with a residual current safety switch of the afore-stated type by connecting an evaluation switch and/or the overvoltage protection circuit to power outlets for supply of voltage when the switching contacts are closed through lines, with one line extending through the residual current transformer and the other line being guided outside the residual current transformer, wherein the supply current of the electronic components and/or the current that flows through the overvoltage protection circuit is lower than the triggering current when the nominal voltage is applied.

Through these measures, the occurrence of static overvoltages, of excessive power supply, or a defect of the voltage supply of the electronic components results in an activation of the trigger device. Thus, the residual current safety switch is capable to separate itself from the power supply at particular defects or overloads of the electronic components to eliminate any risk that the malfunction of the switch remains unnoticeable under certain conditions.

According to another feature of the present invention, the overvoltage protection circuit is connected parallel to the evaluation circuit, and the trigger device is connected in series to this parallel connection. This is advantageous as an adjustment of the sensitivity of the overvoltage protection over a wide range is effected, without significantly influencing the evaluation circuit, whereby a remaining impact can be taken into account during configuration and dimensioning of the evaluation circuit.

BRIEF DESCRIPTION OF THE DRAWING

The invention will now be described in more detail with reference to the drawings, with FIGS. 1, 2, 3 schematically illustrating different embodiments of a DI-switch according to the invention.

DETAILED DESCRIPTION OF PREFERRED EMBODIMENTS

Figure 1:
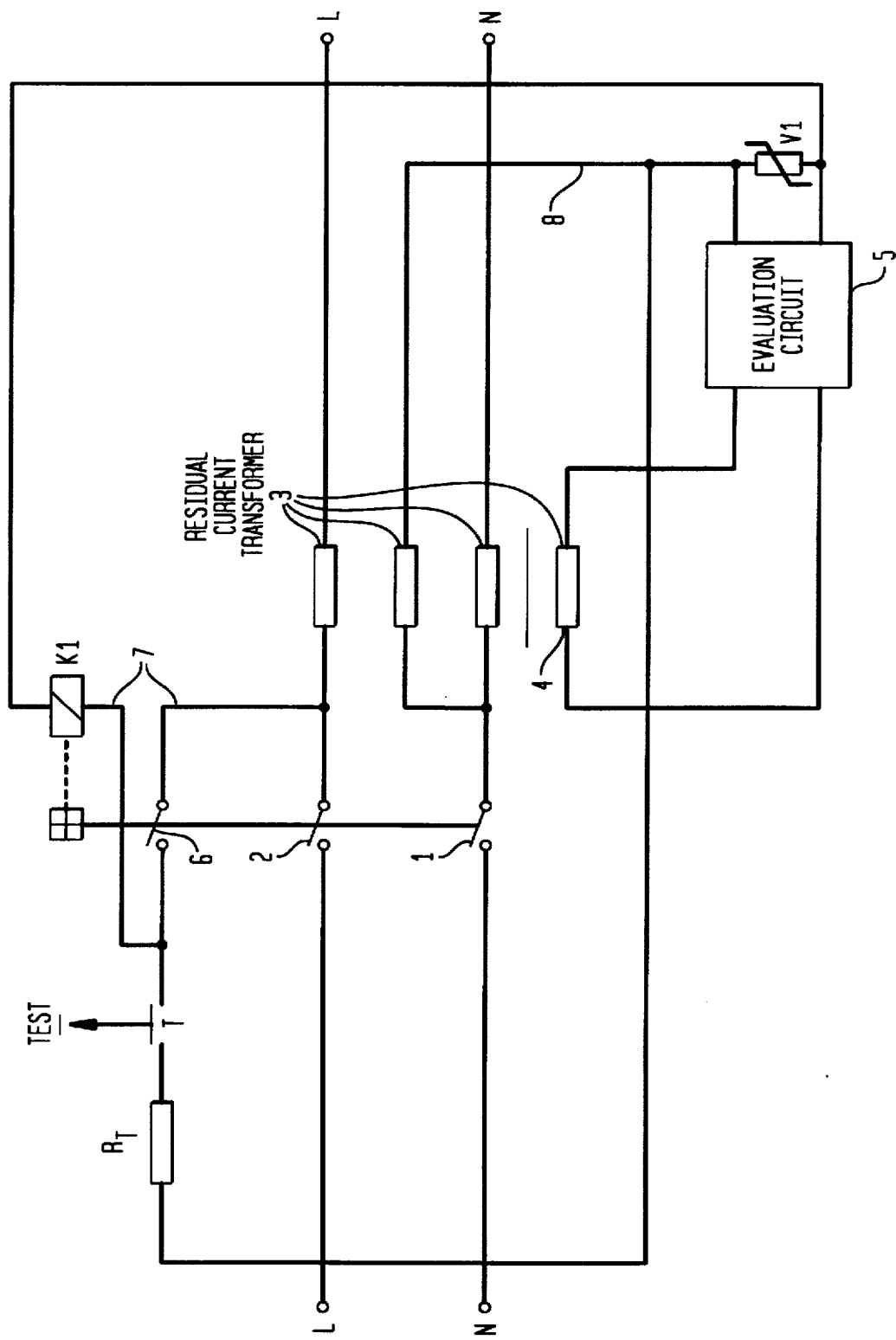

The DI-switch according to FIG. 1 is connected by the fixed conductors of both its switching contacts 1, 2 to power outlets L, N. Positioned downstream of these switching contacts 1, 2 is a residual current transformer 3 which has a secondary winding 4 connected to the evaluation circuit 5 that evaluates an encountered secondary current caused by residual current.

The evaluation circuit 5 is connected to an electromagnetic trigger device K1 for controlling the switching contacts 1, 2 and an auxiliary contact 6 which separates the electronic components from the power outlet independently from the power supply end or consumer end of the DI-switch.

The voltage supply of the evaluation circuit 5 is effected via the electromagnetic trigger device K1 as well as via the lines 7, 8 and the preceding auxiliary contact 6, with one of both lines 7 or 8 (line 8 in the attached Figure) extending through the residual current transformer 3 and tapping the voltage only behind the differential current transformer 3, and the second line (line 7 in the attached Figure) not extending through the transformer and tapping the voltage already before the residual current transformer.

Further connected in parallel relationship to the evaluation circuit is an overvoltage protection element V1.

The voltage-dependent resistor V1 is so dimensioned that the current flowing through the voltage-dependent resistant V1 at nominal voltage or at elevated voltage only within a tolerable degree is smaller than the residual current required for a triggering.

When encountering an overvoltage or a defect in the voltage supply of the evaluation circuit, a respective residual current flows through the transformer 3 and is recognized as faulty current so that the trigger device K1 is activated by the evaluation circuit 5 when a particular preset value is exceeded.

As a result, also the supply of the evaluation circuit 5 and thus of the overvoltage protection circuit formed by the overvoltage protection element V1 is interrupted, to thereby eliminate a damage to the DI-switch and a threat to the installation connected.

A resistor RT switched in series with a test key T is further disposed in a line 9 which connects the lines N and L when the switching contacts 1,2 and thus the auxiliary contact 6 are closed. By pressing this key T, a residual current flows across the resistor RT and via the line extending externally of the residual current transformer 3 and is of such magnitude as to enable an activation of the trigger device K1.

Figure 2:
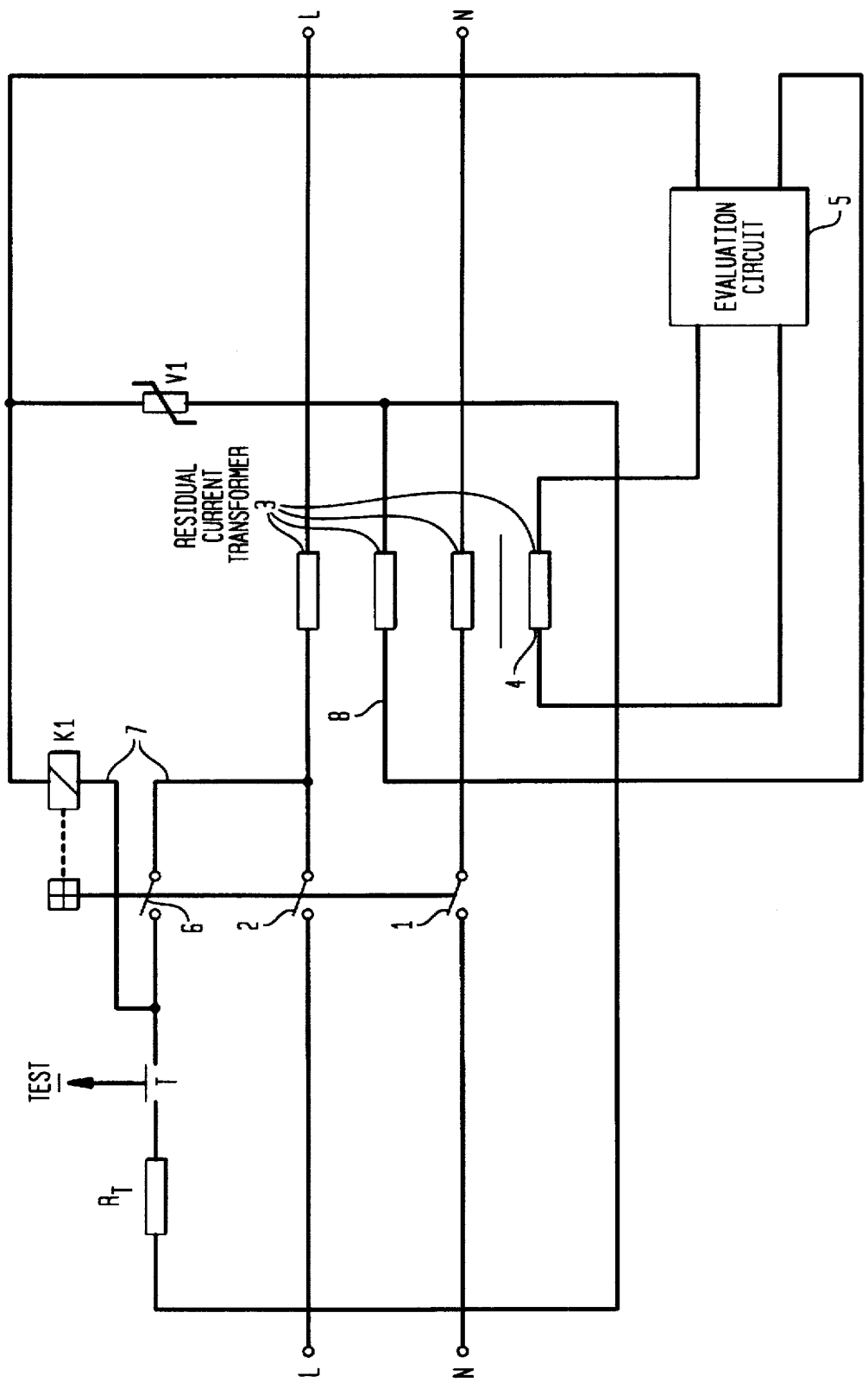

The embodiment according to FIG. 2 differs from the one according to FIG. 1 in that the voltage-dependent resistor V1 is not connected in parallel to the outputs of the evaluation circuit 5; Rather, it is connected via the electromagnetic trigger device K1 with the one live terminal L and via the line 8, which is guided through the residual current transformer 3, with the other live terminal N. The evaluation circuit 5 is fed independently from the line 8 which is guided through the residual current transformer 3.

Figure 3:
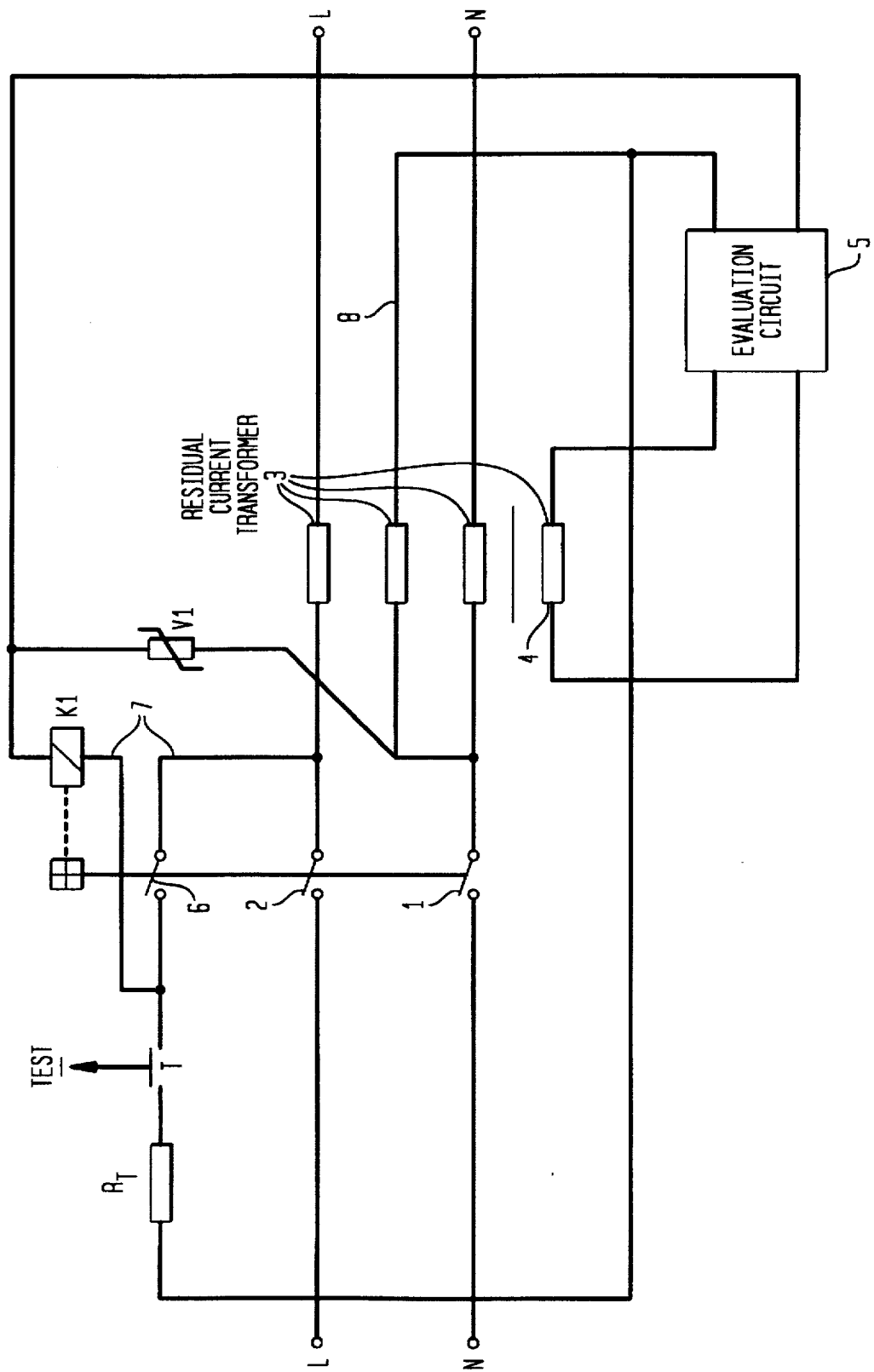

The conditions in the embodiment according to FIG. 3 are exactly reversed as in FIG. 2 by feeding the evaluation circuit 5 only via the line 8 which is guided through the residual current transformer 3, but not the voltage-dependent resistor V1.

The embodiments according to FIGS. 1 to 3 differ thus from each other in such a manner that upon closing of both switching contacts 1, 2, the evaluation circuit 5 as well as the overvoltage protection circuit V1 are connected via the lines 7, 8 with live terminals in case of FIG. 1, while in accordance with FIG. 2 this is true only with regard to the overvoltage protection switch V1, and in accordance with FIG. 3 only with regard to the evaluation circuit 5.

What is claimed is:

1. A residual current safety switch, comprising:

a residual current transformer (3);

an evaluation circuit (5) connected to the transformer and controlling an electromagnetic trigger device (K1) for actuation of switching contacts (1, 2); and an overvoltage protection circuit (V1), wherein at least one element selected from the group consisting of the evaluation circuit (5) and the overvoltage protection circuit (V1) is connected to power outlets (L, N) when the switching contacts (1, 2) are closed for providing a voltage supply, with the connection between the at least one element and the power outlets being effected by lines (7, 8), with one line extending through the residual current transformer (3) and the other line being guided outside the residual current transformer (3), wherein the supply current and/or the current that flows through the overvoltage protection circuit (V1) is lower than the triggering current when the nominal voltage is applied.

2. The residual current safety switch of claim 1 wherein the overvoltage protection circuit (V1) is coupled to the evaluation circuit (5) by a parallel connection, and the trigger device (K1) is connected in series to the parallel connection.

* * * * *